Figure 9:
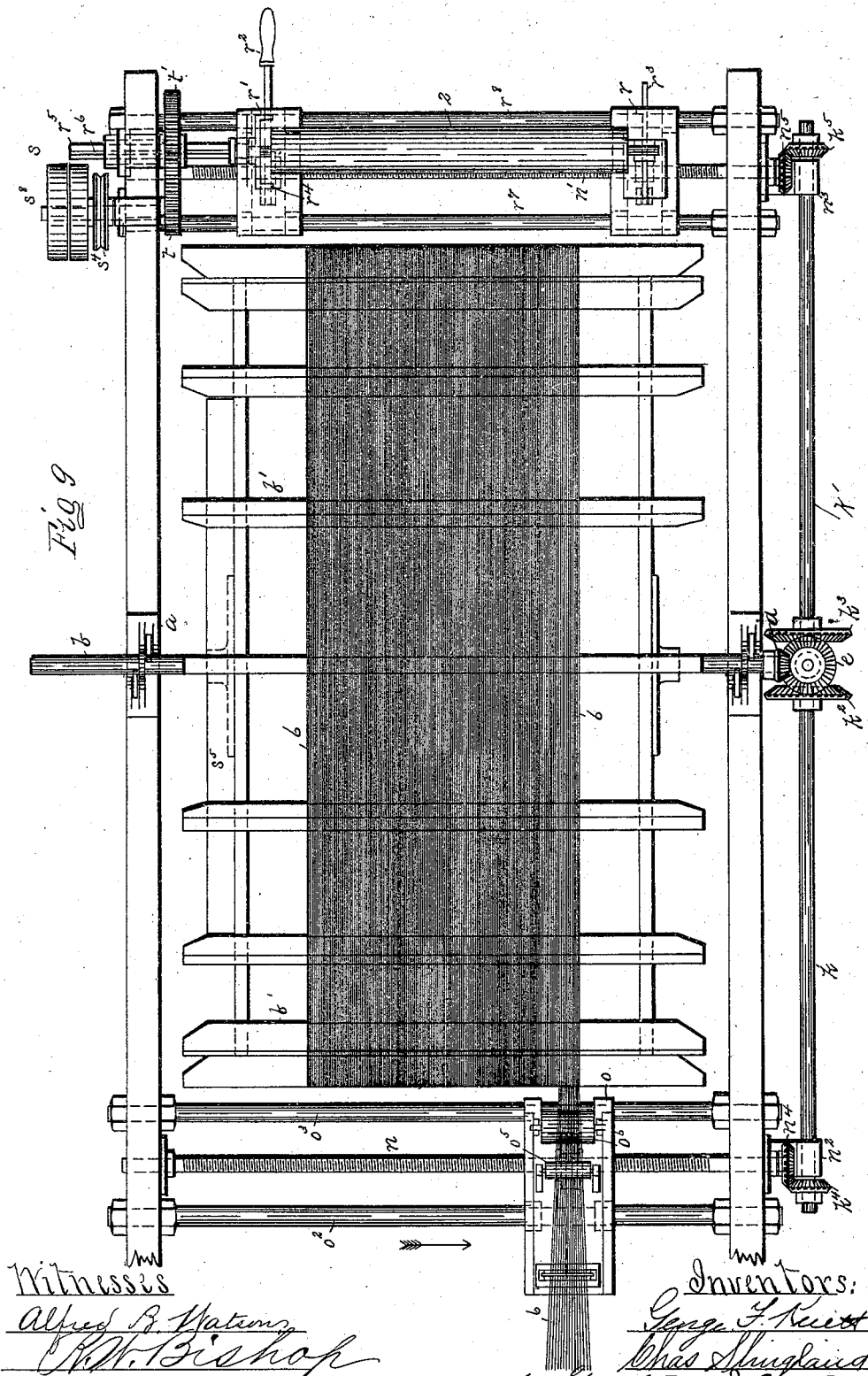

(No Model.) 5 Sheets—Sheet 1.
G. F. KUETT & C. SLINGLAND.
WARPING MACHINE.
No. 478,162. Patented July 5, 1892.
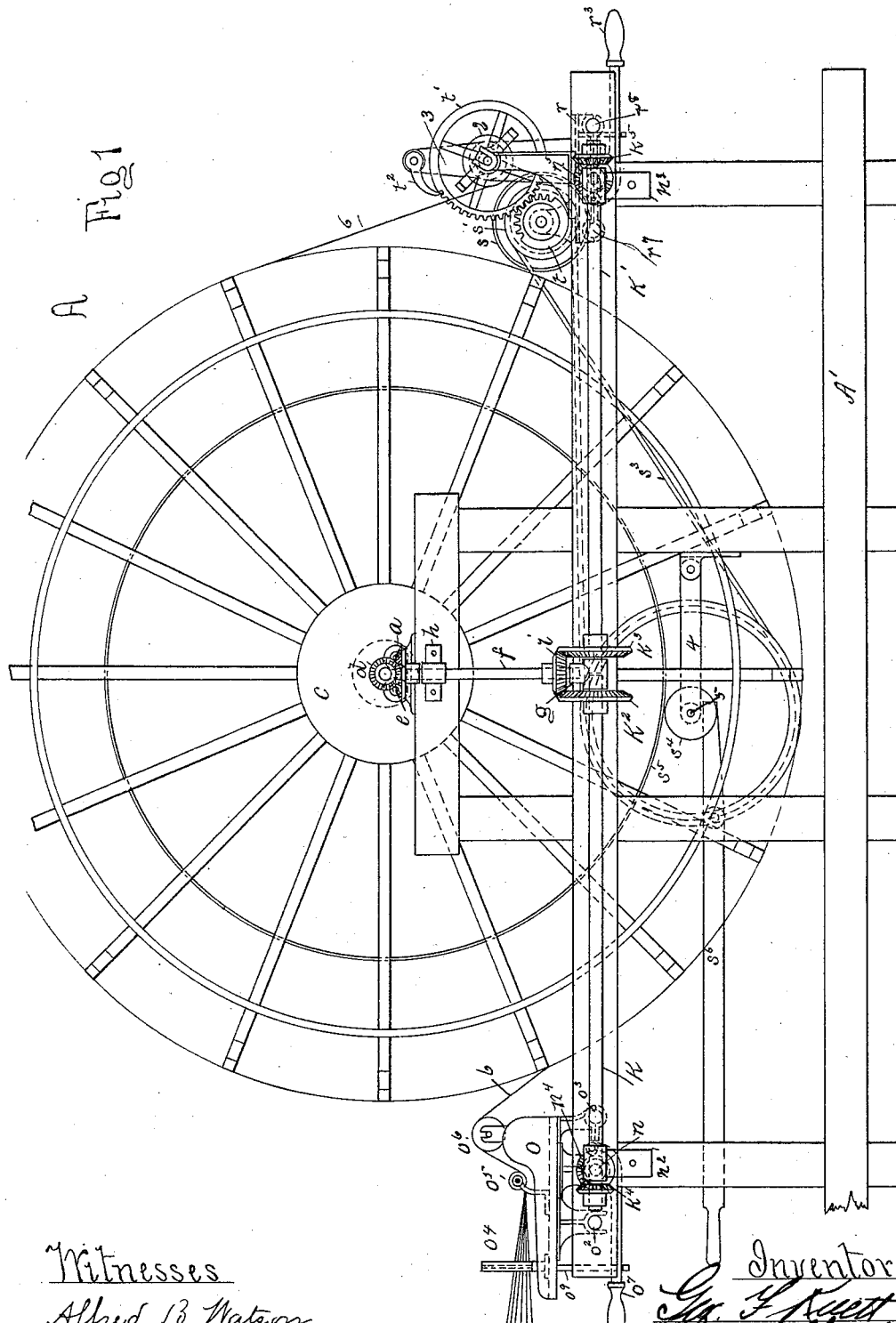
Witnesses
Alfred B Watson
Geo. W. Graham
Inventors:
G. F. Kuett
Charles Slingland
By John Inglis atty (No Model.) 5 Sheets—Sheet 2.
G. F. KUETT & C. SLINGLAND.
WARPING MACHINE.
No. 478,162. Patented July 5, 1892.
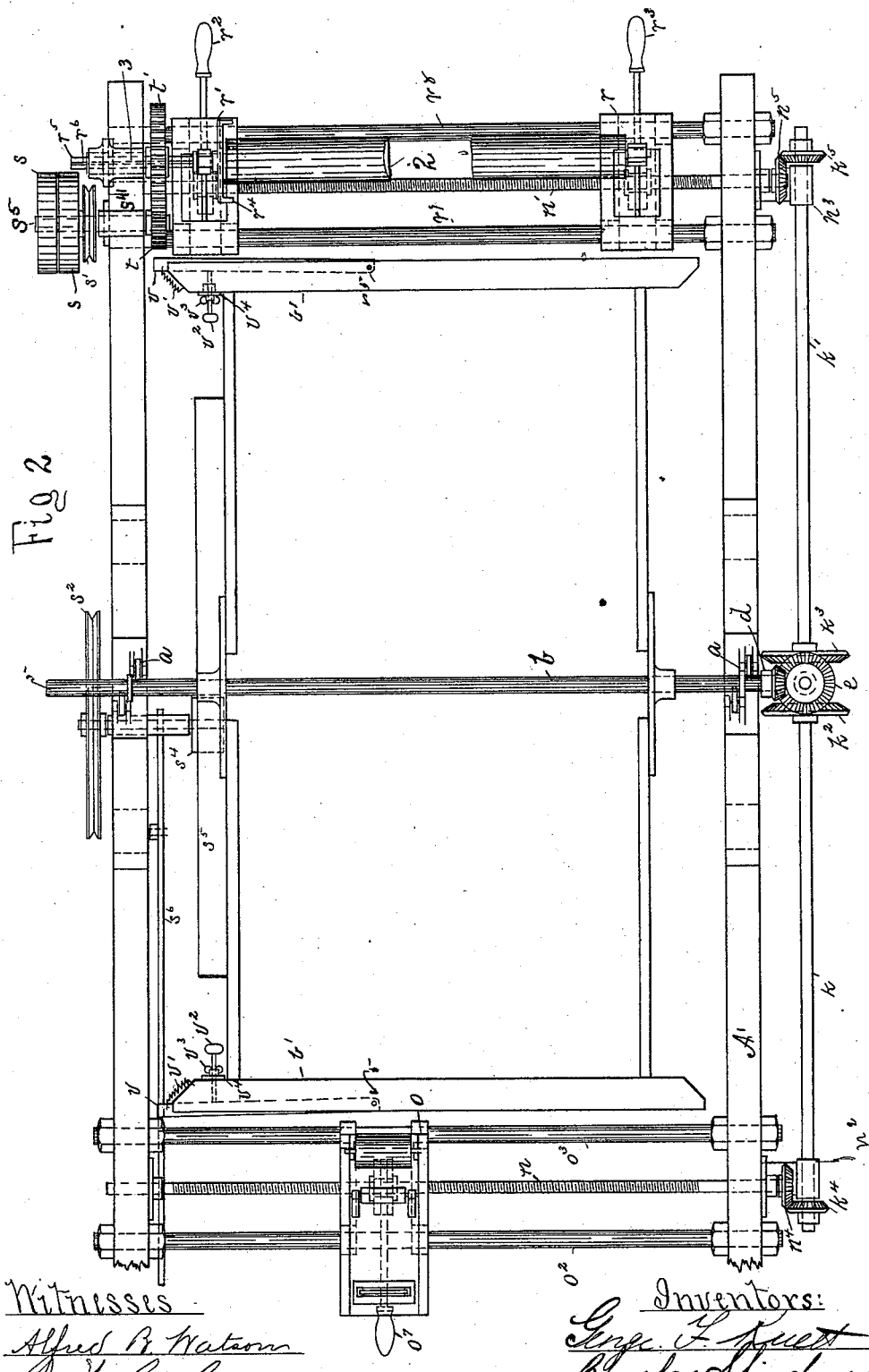

(No Model.) 5 Sheets—Sheet 3.
G. F. KUETT & C. SLINGLAND.
WARPING MACHINE.
No. 478,162. Patented July 5, 1892.
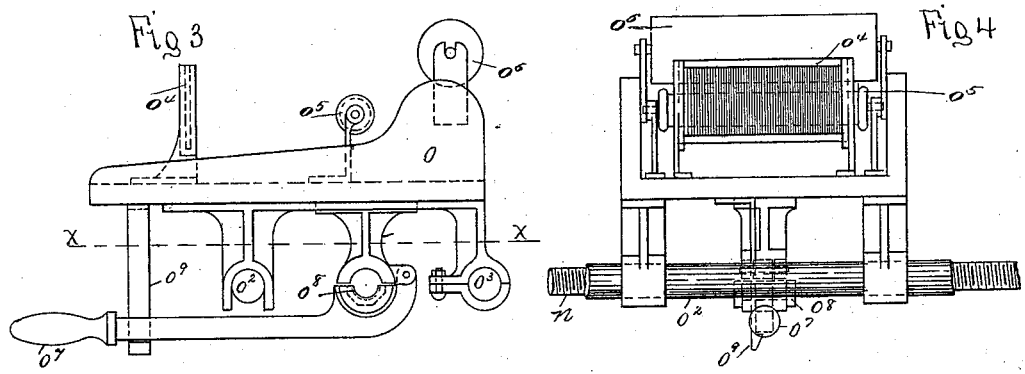
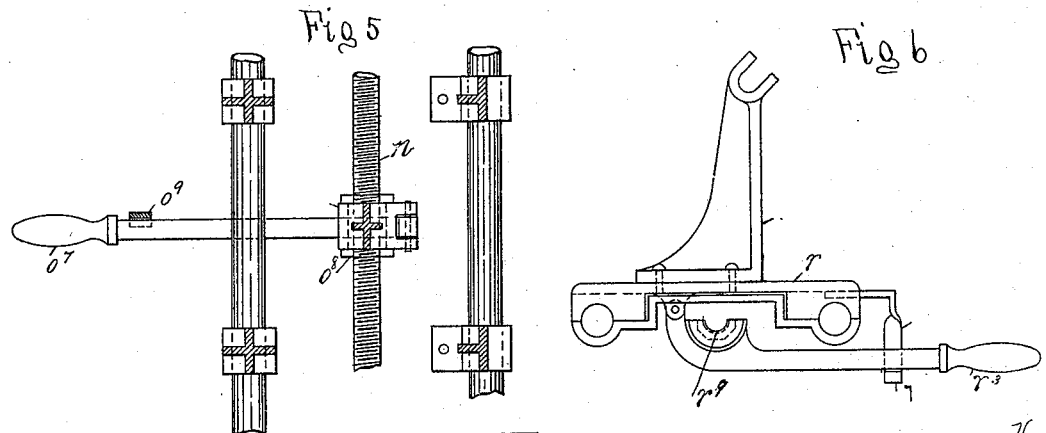
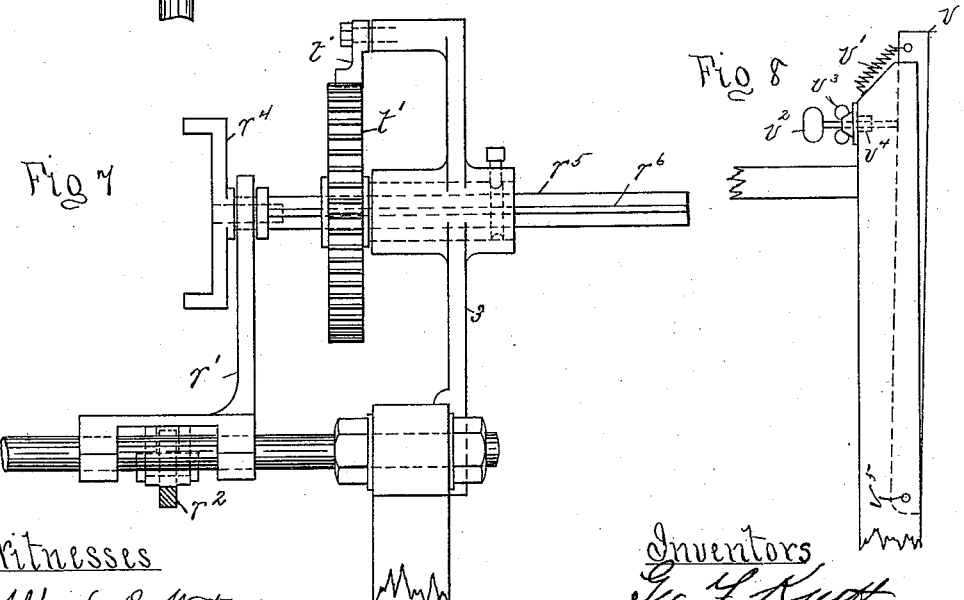
Witnesses
Alfred B. Watson
Geo. W. Graham
Inventors
Geo. F. Kuett
Charles Slingland
By John Inglis Atty (No Model.) 5 Sheets—Sheet 4.

G. F. KUETT & C. SLINGLAND.
WARPING MACHINE.

No. 478,162. Patented July 5, 1892.

Witnesses
Alfred B. Watson
R. W. Bishop

Inventors:
George F. Kuett
Chas Slingland
by Gartner & Co. Attys

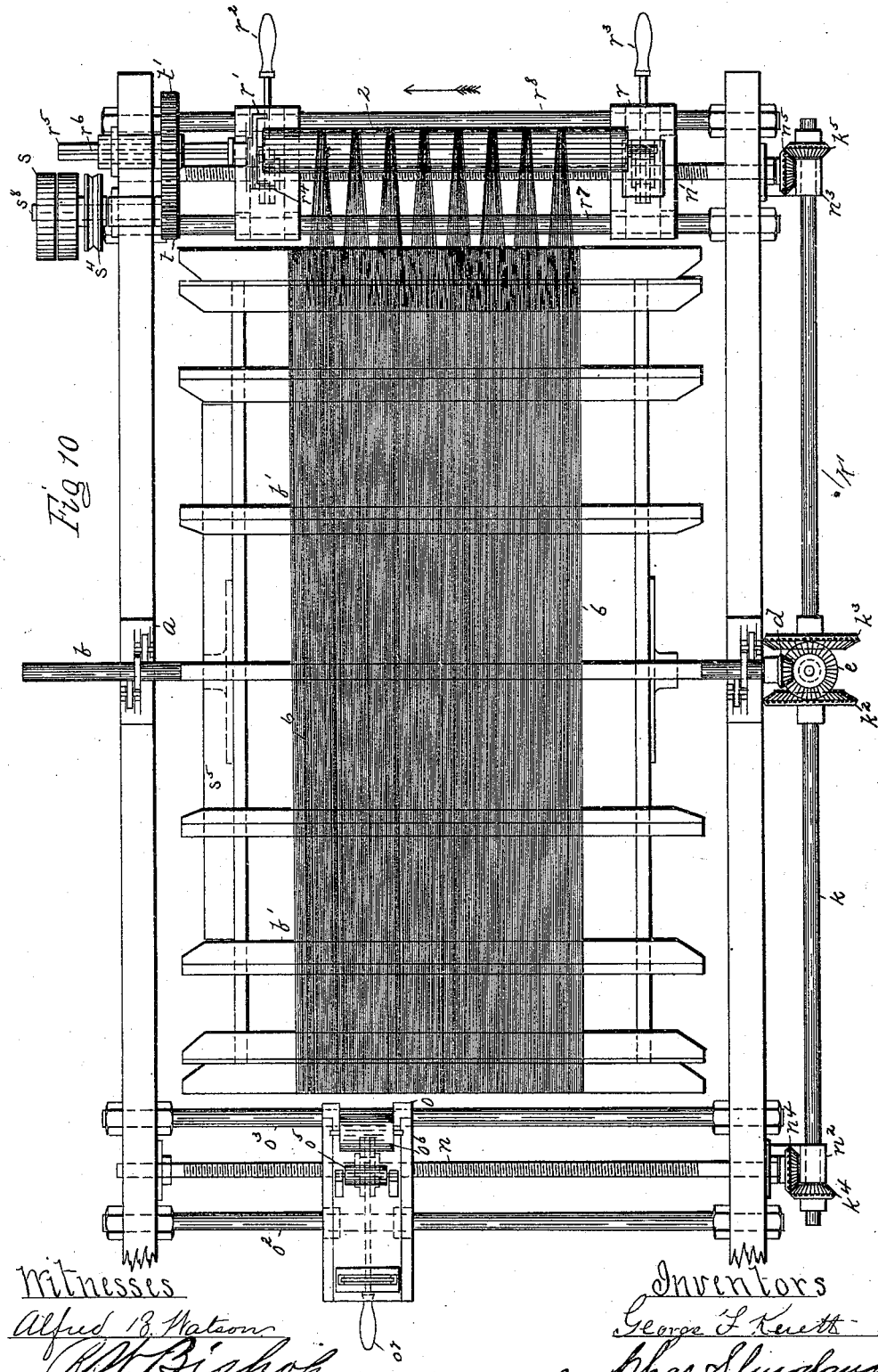

UNITED STATES PATENT OFFICE.

GEORGE F. KUETT AND CHARLES SLINGLAND, OF PATERSON, NEW JERSEY.

WARPING-MACHINE.

SPECIFICATION forming part of Letters Patent No. 478,162, dated July 5, 1892.

Application filed September 18, 1890. Serial No. 365,391. (No model.)

*To all whom it may concern:*

Be it known that we, GEORGE F. KUETT and CHARLES SLINGLAND, citizens of the United States, residing at Paterson, Passaic county, State of New Jersey, have invented a new and useful Improvement in Warping-Machines, of which the following is a specification, reference being had to the accompanying drawings, forming a part thereof.

The object of our invention is to provide an improved warping-machine wherein beaming facilities are combined.

The object sought we attain by devices illustrated in the accompanying drawings, which will be hereinafter fully described and claimed, in which—

Figure 1 is a side elevation of the machine. Fig. 2 is a part plan of the same, the beam being broken in such figure. Fig. 3 is a detailed view of the reed-frame in elevation detached. Fig. 4 is a front view of the same. Fig. 5 is a section of the same on line $x\,x$ of Fig. 3. Fig. 6 is a detached view of the beam-holders. Fig. 7 shows the driving mechanism of the same. Fig. 8 is a detached view of a bar for equalizing the warps; and Figs. 9 and 10 are plan views, Fig. 9 showing the threads as being wound on the reel and Fig. 10 showing them as being drawn onto the warping-beam.

A represents a horizontal warping-machine having the usual supporting-frame A', on and to which frame are arranged and secured devices as follows:

Central in the machine A, on each side of the same, in an elevated portion of the frame A', are secured by bolts or otherwise roller-bearings $a$, in which bearings is journaled shaft $b$ of a wheel or reel $c$, as shown. This shaft $b$ of the reel $c$, which is transversely arranged in the machine, is provided at one end of the same with a gear-wheel $d$, that gears with and actuates a like gear $e$ and its shaft $f$, which shaft is vertically arranged and which is supported in a step $g$ at its bottom and is held in position at its top by a bearing $h$, fastened to frame A'. The said shaft $f$ has a gear $i$ near its lower end by which motion is communicated from the wheel or reel $c$ to two horizontally-arranged shafts $k\,k'$ by means of gears $k^2\,k^3$, respectively, with which gear $i$ engages, as shown in Figs. 1 and 2. The shafts $k\,k'$, which are journaled and supported in bracket-bearings $n^2\,n^3$ near their outer ends and in step-bearing $g$ at their inner ends fastened to frame A', are provided with gears $k^4\,k^5$ at their said outer ends, respectively, by which they gear with and turn gears $n^4\,n^5$ and their screws $n\,n'$, which latter are journaled in frame A' at opposite ends of the machine, as shown. Screw $n$ is transversely arranged in bearings formed in the machine-frame and by the motion it receives from shaft $k$ by means of a lever $o^7$, having a threaded portion $o^8$, with which the screw engages, is adapted to carry on and over rods $o^2\,o^3$ a reed-frame $o$, with its reed $o^4$ and rollers $o^5\,o^6$, all of which are arranged as shown in Figs. 1, 2, and 3. The screw $n'$, which is arranged and journaled in the frame A' at the front of the machine, by the motion it receives from shaft $k'$ is adapted to carry beaming-frames $r\,r'$ and beam 2 on and over rods $r^7\,r^8$ in the operation of beaming, like frame $o$ in the operation of warping, by reason of brackets which conform to the shape of the rods upon which they bear. The innermost of these brackets on frames $o$ and $r\,r'$ encircle the rods $o^3\,r^7$, respectively, and act to hold the frames in position on the rods in their movements, while the middle brackets, upon which the frames $r\,r'$ and $o$ rest, carry threaded levers $r^2\,r^3\,o^7$, respectively, by means of which levers frames $r\,r'\,o$ are put into engagement with their respective screws $n\,n'$ in the operation of warping and beaming, as hereinafter more fully stated.

At one side of the machine, in front of the same and fixed to the frame A', is a standard 3, having a pawl $t^2$, into which standard is journaled the sleeve portion of a gear $t'$, said sleeve portion being integral with the said gear $t'$. A mandrel $r^5$, having a feather $r^6$ and clutch $r^4$ passing through the sleeve, is journaled in frame $r'$. This construction permits the mandrel to pass endwise through the sleeve while the latter is in rotation. (See Fig. 7.)

In a beaming $s^{41}$, fixed in frame A', is journaled a driving-shaft $S^5$, having the usual pulleys $s\,s\,s'$ and a pinion $t$, by which motion is imparted to gear $t'$. Motion is also given to wheel $s^2$ by band $s^3$, connecting pulleys $s'$ $s^2$. The said wheel or pulley $s^2$ is journaled on a stud 5, projecting from an arm 4, which stud also has arranged on it a friction-wheel $s^4$, designed to engage a rim $s^5$ on reel $c$, while a lever $s^6$, fulcrumed to machine-frame, underlies the free end of the pulley-arm 4. (See Fig. 1.)

In each one of the arms $b'$ of the reel $c$ at one end is arranged an equalizing-bar $v$, pivoted at $v^5$ and which is adjusted to the want of the warps by a thumb-screw $v^2$ and which is held to its adjustment by a thumb-nut $v^3$, while a spring $v'$ is arranged to hold the bar $v$ in its lowest position. (See Figs. 2 and 8.)

Our machine is intended more especially for use in making warps of a large number of threads to a comparatively small space and in which the warp cannot be made in one run of the machine and must be made in sections.

For convenience of description we will suppose it is desired to make a warp of four thousand threads to twenty-four inches and that there are two hundred spools to make the warp. The threads from the spools are drawn through the reed $o^4$ to a width of one and one-fifth inches, and the ends secured to the reel after being passed under the roller $o^5$ and over the roller $o^6$. The lever $o^7$ is then raised, so as to put the frame $o$ into engagement with the screw $n$ and the machine is put in motion. The reel will thus be caused to rotate and draw the threads from the frame $o$, and the said frame $o$ will be given a lateral movement in the direction indicated by the arrow in Fig. 9, so as to lay the threads evenly and smoothly on the reel. When the section has been run off to such a length as to form one complete layer, the threads are cut and the ends temporarily secured. The second section is then run off in the same manner, being started one and one-fifth inches to the right of the first section, or toward the base of the arrow seen in Fig. 9, and the operation is repeated until the entire warp has been run off, after which the lever $o^7$ is lowered, so as to disengage the frame $o$ from the screw $n$. The warp is now to be run onto the beam. This is accomplished in the following manner: The beam is put in position between the frames $r\ r'$ and midway the sides of the machine, and the ends of the several warp-sections are secured thereto. The levers $r^2\ r^3$ are then raised, so as to engage the screw $n'$, and the mandrel $r^5$ then thrust inward. The machine is then again put in motion, when the clutch $r^4$ will cause the beam to turn and draw the threads from the reel, while the screw $n'$ causes the frames $r\ r'$ to travel in the direction indicated by the arrow in Fig. 10, which, it will be noticed, is contrary to the lateral travel of the reed-frame. The warps will thus be laid evenly and straight on the beam. In order to first lay the threads on the reel in an entirely even manner, it is necessary to give the reed-frame a lateral movement, as described. The threads will consequently run gradually to one side of the reel, and it is necessary to give the beam a lateral movement, so as to wind the threads straight thereon.

It is obvious from the foregoing that we have produced a machine capable of both warping and beaming, and that its use will effect a great economy of time and labor.

We claim as new and desire to secure by Letters Patent in a warping-machine such as shown:

1. In a warping-machine, the combination, with the frame $A'$, of the reel $c$, journaled in the said frame $A'$ and having the rim $s^5$, a gear $d$ on the shaft of said reel, the vertical shaft $f$, having a gear $e$ engaging gear $d$ and a gear $i$ on its lower end, the shaft $k$, having a gear $k^2$ engaging gear $i$ and a gear $k^4$ on its outer end, the screw $n$, carrying a gear $n^4$, engaging gear $k^4$, rods $o^2\ o^3$, frame $o$, sliding on said rods and carrying a lever $o^7$, designed to engage said screw $n$, and thus propel frame $o$, the arm 4, and a wheel $s^4$ on said arm, adapted to frictionally engage the rim $s^5$, the lever $s^6$, pivoted to frame $A'$ and adapted to engage arm 4, and means to rotate wheel $s^4$, substantially as described.

2. In a warping-machine, the combination, with the frame $A'$, of the reel $c$, journaled in the said frame $A'$, a gear $d$ on the shaft of said reel, the vertical shaft $f$, having a gear $e$ engaging gear $d$ and a gear $i$ on its lower end, the shaft $k'$, having a gear $k^3$ engaging gear $i$ and a gear $k^5$ on its outer end, the screw $n'$, carrying a gear $n^5$, engaging gear $k^5$, rods $r^7\ r^8$, frames $r\ r'$, sliding on said rods and carrying levers $r^3\ r^2$, respectively, designed to engage screw $n'$, and thus propel frames $r\ r'$, the mandrel $r^5$, having a feather $r^6$ and clutch $r^4$, the gear-wheel $t'$, rotating said clutch, safety-pawl $t^2$, and means for actuating said gear-wheel $t'$, substantially as described.

GEORGE F. KUETT.
CHARLES SLINGLAND.

Witnesses:
GEO. W. GRAHAM,
WILLIAM E. FISCHER.